United States Patent
Spina

(10) Patent No.: US 6,656,554 B1
(45) Date of Patent: *Dec. 2, 2003

(54) SEPARABLE LABEL ASSEMBLY IN CONTINUOUS ROLL FORM AND METHOD OF MANUFACTURING SAME

(76) Inventor: Thomas N. Spina, 1925 Swarthmore Ave., Lakewood, NJ (US) 08701

( * ) Notice: Subject to any disclaimer, the term of this patent is extended or adjusted under 35 U.S.C. 154(b) by 0 days.

This patent is subject to a terminal disclaimer.

(21) Appl. No.: 09/359,887

(22) Filed: Jul. 26, 1999

(51) Int. Cl.[7] ................................................. B32B 7/06
(52) U.S. Cl. .......................................... 428/40.1; 283/72
(58) Field of Search .............................. 428/40.1, 41.3, 428/41.4, 41.5, 41.8, 42.1, 42.2, 914; 503/200, 226; 283/72, 81, 100, 107, 108, 109, 51; 40/615; 229/70

(56) References Cited

U.S. PATENT DOCUMENTS

| | | | | |
|---|---|---|---|---|
| 4,837,088 A | * | 6/1989 | Freedman ................... 156/243 |
| 4,925,714 A | * | 5/1990 | Freedman ................... 428/40 |
| 5,227,410 A | * | 7/1993 | Eckberg et al. ............. 522/75 |
| 5,240,971 A | * | 8/1993 | Eckberg et al. ............. 522/31 |
| 5,369,205 A | * | 11/1994 | Eckberg et al. ............. 528/25 |
| 5,895,074 A | * | 4/1999 | Chess et al. ................. 283/75 |
| 5,914,165 A | * | 6/1999 | Freedman ................. 428/40.1 |
| 6,022,051 A | * | 2/2000 | Casagrande ................ 283/107 |

* cited by examiner

Primary Examiner—Harold Pyon
Assistant Examiner—Alicia Chevalier
(74) Attorney, Agent, or Firm—Clifford G. Frayne

(57) ABSTRACT

A multi-layer, pressure sensitive label having a print receiving layer, a sealant layer, a silicone layer, a varnish layer and an adhesive layer, whereby the pressure sensitive label is separable from a substrate between the silicone and a varnish layer leaving a transparent surface allowing the viewing or reading of any underlying text, message or indicia on the substrate.

14 Claims, 2 Drawing Sheets

SEPARABLE LABEL ASSEMBLY IN CONTINUOUS ROLL FORM AND METHOD OF MANUFACTURING SAME

BACKGROUND OF THE INVENTION

1. Field of Invention

The particular invention relates to label assemblies and more particularly to a label assembly having multiple layers, one such layer susceptible to receiving printed information by direct thermal transfer, the multiple layers being separable after attachment to a substrate, leaving no tacky surface and a substantially transparent surface to enable one to read printing on the underlying substrate.

2. Description of the Prior Art

Pressure sensitive labels are well-known in the art. It would seem evident that one could simply apply pressure sensitive labels to containers and have the customers simply peel off the labels where necessary. However, the labels may be difficult to remove from certain types of surfaces, packages or substrate unless the label or the packages are coated with a release agent. Providing the release agent to the packages or the substrate is not often economically feasible and oftentimes requires expensive special manufacturing techniques. Further, the pressure sensitive label, once removed, would leave a sticky or tacky backing which is undesirable from the consumer standpoint, and also from the handling of the packages. Still further, it is oftentimes necessary that once the label is removed, that the user be able to read any underlying printing, text or information that is printed on the packaging.

One layer of the pressure sensitive label is normally susceptible to receiving printed information. This layer usually comprises paper and the standard in the industry is to imprint the printing or information on the paper layer of the pressure sensitive label by a thermal transfer method in which a heated print head is positioned proximate to the paper layer of the pressure sensitive label there being disposed between the paper layer of the pressure sensitive label and the heated print head, an ink ribbon by which the heated print head transfers or melts the selected indicia, message or text onto the paper layer of the pressure sensitive adhesive. This method of thermal transfer of the indicia, text or message is well-known in the art. However, recent advances have led to the development of a direct thermal printing method in which the ribbon heretofore disposed between the heated printed head and the paper layer of the pressure sensitive label is no longer required. The paper layer of the pressure sensitive label is now chemically treated such that when brought into proximate distance with a heated print head, the desired indicia, text or message appears directly on the paper layer as a result of the chemical composition of the paper layer and thereby obviating the need for the ribbon.

The problems associated with the direct thermal printing method and pressure sensitive labels as heretofore known in the art is that the multiple layers associated with pressure sensitive labels will chemically interfere with the printing process undertaken by the direct thermal printing method as opposed to the thermal transfer method. Therefore it has become necessary to develop a multi-layer, pressure sensitive adhesive which can be easily peeled from the substrate, package or other surface to which it is applied, leaving a non-tacky surface, and allowing one to visibly read the text, indicia or information on the substrate or package and allow the indicia, message or text to be printed on the paper layer of the pressure sensitive label by means of the direct thermal printing process. Applicant has developed a multi-layer label assembly which accomplishes all of the aforesaid purposes and can be utilized with either printing method.

OBJECTS OF THE INVENTION

An object of the present invention is to provide for a novel pressure sensitive label assembly having a paper layer which allows for an indicia, message or text to be printed by means of a thermal printing process onto the paper layer.

A further object of the present invention is to provide for a novel pressure sensitive label assembly in which the multiple layers of the pressure sensitive label are separable after the pressure sensitive label has been applied to a substrate packaging or the like, the separation leaving a non-tacky surface on the substrate or packaging.

A further object of the present invention is to provide for a novel, multi-layer, pressure sensitive label, which after separation of the multiple layers of the pressure sensitive label allows for a substantially transparent layer or layers remaining on the substrate or packaging allowing the user to read any underlying text, indicia or message on the packaging.

A still further object of the present invention is to provide for a method of manufacturing a continuous multi-layer, pressure sensitive label web on which an indicia can be printed using a direct thermal printing process and which discrete label and indicia can be cut from the web and applied to a substrate, and which layers of the multi layer label are separable after having been applied to a substrate or packaging leaving a non-tacky surface and a substantially transparent, non-tacky layer on the substrate or packaging to permit the viewing or reading of any underlying message, text or indicia on the package.

SUMMARY OF THE INVENTION

A multi-layer, pressure sensitive label formed on a continuous roll with discrete labels being cut therefrom, having in order, a paper layer for receiving printing, indicia or text from a printing process overlaid with a release agent, and underlaid with a sealant layer, a further underlying layer of silicone, a further underlying layer of varnish adhesive deadener, the layers of the multi-layer, pressure sensitive label being separable once applied to a substrate between the underlying layer of silicone and the underlying layer of varnish, thereby presenting a non-tacky, transparent surface allowing the viewing or reading of any underlying text, message or indicia on the packaging or substrate to which it is applied.

BRIEF DESCRIPTION OF THE DRAWINGS

These and other objects of the present invention will become evident particular when taken in view of the accompanying drawings in which.

DETAILED DESCRIPTION OF THE DRAWINGS

Figure 1:
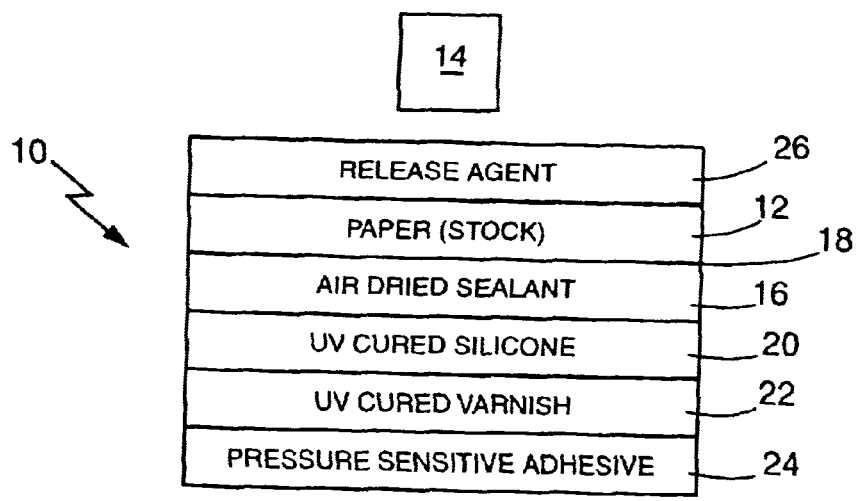
FIG. 1 is an enlarged cross-sectional view of the multi-layered, pressure sensitive separable label.

FIG. 1 is an enlarged cross-sectional view of the multi-layered, pressure sensitive label of the present invention.

The label 10 is composed of a plurality of layers, each of the layers contributing to the function of the separable label 10. For purposes of clarity, the description will start with the paper layer 12. Paper layer 12 is composed of a paper stock having been chemically treated such that it is reactive to heat. The heat would be applied to paper layer 12 by means of a print head 14. The chemical composition of paper 12 would react to the heat from print head 14 such that the desired message, text, or indicia would be printed or appear on paper layer 12.

It is necessary to segregate the paper layer from several of the underlying layers of chemicals in that they will adversely affect the ability of paper layer 12 to develop the text or indicia from print head 14. Therefore a sealant layer 16 is applied to the underside 18 of paper layer 12. In the present embodiment, sealant layer 16 is preferably composed of a glue or mucilage which can be easily and quickly air dried. Thus a sealant layer is provided on the underside 18 of paper layer 12 which prevents the subsequent applied layers from adversely interacting with paper layer 12 and interfering with the printing process. Sealant layer 16 is overlaid with a layer 20 of ultraviolet light cured silicone. Layer 20 is then overlaid with an ultraviolet cured layer of varnish 22. Ultraviolet cured varnish layer 22 is then overlaid with a pressure sensitive adhesive 24.

Since it is desirable to provide the pressure sensitive lable in roll form, with the paper layer being continuous and discrete labels being cut from the roll and applied to a substrate after the indicia is applied, it is necessary to overlay the paper layer with a release agent 26, preferably a UV or thermal curable silicone. This overlay of release agent 26 does not affect the ability of the paper layer to react to the heat from the print head 14. However, it does allow for the separable labels to be formed into continuous rolls and allows for a separable label 10 to be cut from the roll after having been subjected to print head 14 and applied to the substrate.

Ultraviolet cured silicone layer 20 and ultraviolet cured varnish layer 22 are substantially incompatible such that the shear or tensile strength between ultraviolet cured silicone layer 20 and ultraviolet cured varnish layer 22 are less than the shear and tensile strengths between ultraviolet cured silicone layer 20 and sealant layer 16 and ultraviolet cured varnish layer 22 and pressure sensitive adhesive layer 24. Therefore, once paper layer 12 has received its text, message or indicia as a result of exposure to print head 14, it is cut from the roll, the label is securely affixed to the substrate by means of pressure sensitive adhesive layer 24.

Figure 2:
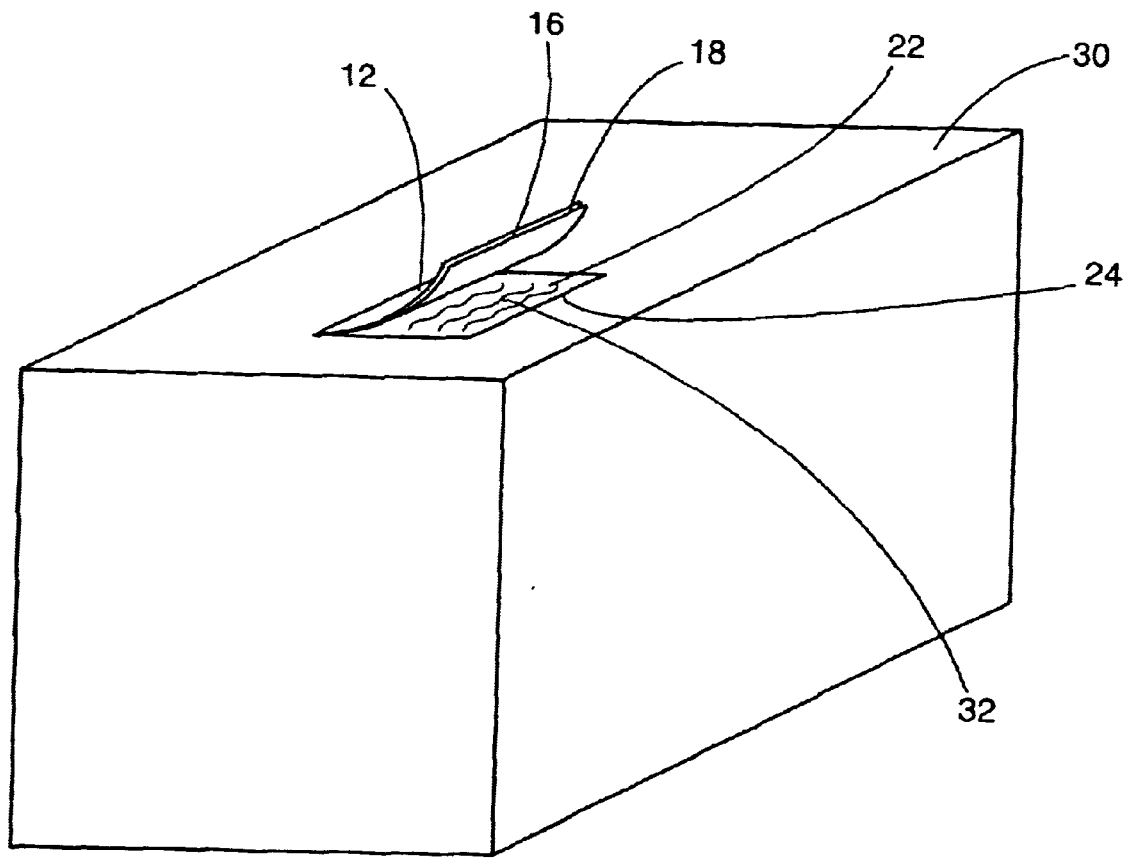
FIG. 2 is a prospective view of the multi-layer, pressure sensitive label being removed from a substrate or packaging, thereby allowing the intended use of viewing any underlying text, message or information.
Figure 3:
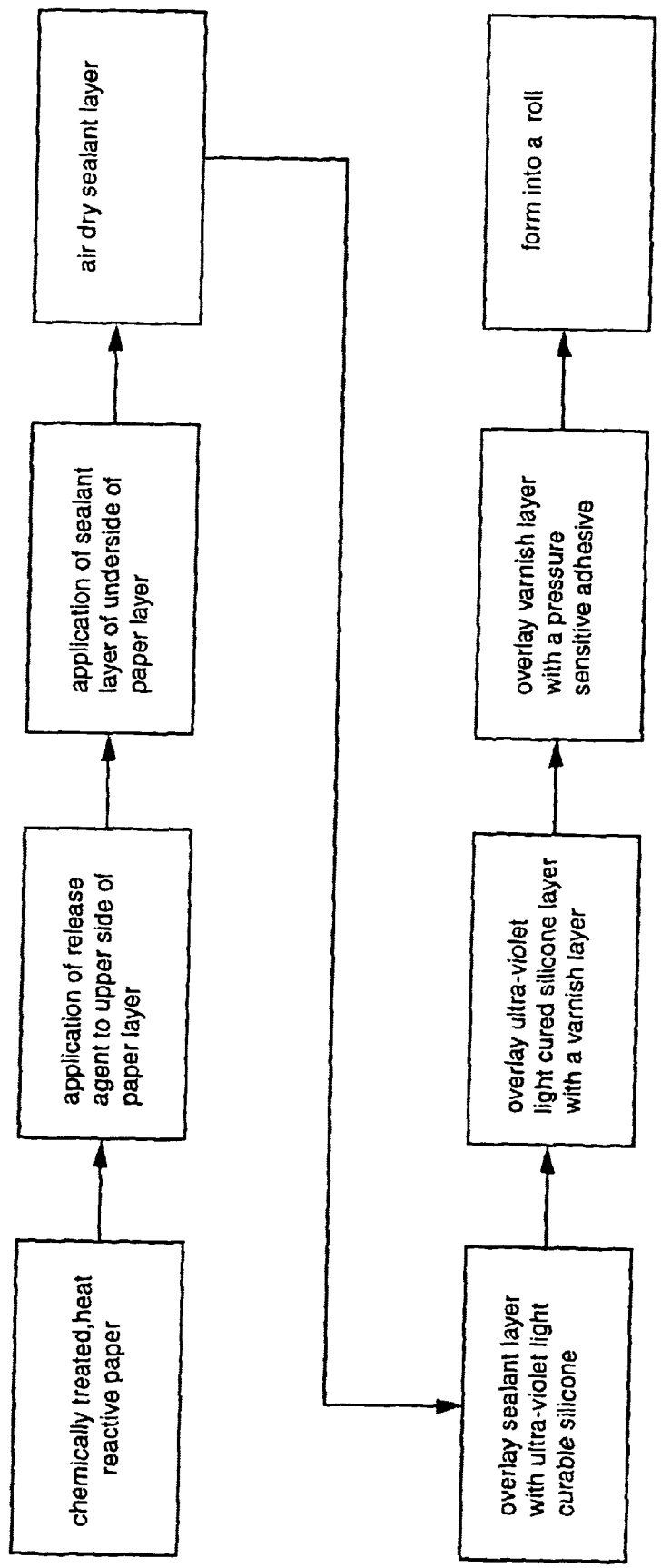
FIG. 3 is a flow chart for the process of making a multi-layered, pressure sensitive separable label in accordance with the present invention.

As illustrated in FIG. 2, the paper layer 12, sealant layer 16, and ultraviolet cured silicone layer 20 are separable or peelable from the ultraviolet cured varnish layer 22 and pressure sensitive adhesive layer 24 once the label has been affixed to a substrate. The reasons for wishing to remove the upper layers of the label are varied, but one particular instance in which the removal is desirable is when the label 10 is affixed to a package with the paper layer 12 carrying a bar code indicia. The label may be randomly applied to the substrate of the package and thus cover up printing on the package such as an address or other pertinent information or directions. The package itself is directed to its penultimate destination by means of the bar code, however, the underlying address, message or directions may be necessary in order to complete the delivery. Therefore it is desirable to be able to remove the opaque portion of the label which consists of paper layer 12, sealant layer 16 and ultraviolet cured silicone layer 20. This removal leaves the ultraviolet cured varnish layer 22 and pressure sensitive adhesive layer 24 on the package. The pressure sensitive adhesive layer is overlaid by the ultraviolet cured varnish layer 22 such that there is no tackiness or stickiness on the package and the ultraviolet cured varnish layer and pressure sensitive adhesive layer 22 and 24 respectively, are transparent which allows the individual to read the underlying address, message or directions. In FIG. 2, the partially shown package 30, has an underlying address 32 for the destination of the package. This address 32 has been partially overlaid by peelable label 10 and it is therefore desirable to be able to remove the label in order to read the underlying message 32. FIG. 2 illustrates the removal of paper layer 12, sealant layer 16 and ultraviolet cured silicone layer 20 from underlying layers 22 and 24 which are substantially transparent thereby allowing viewing access to the underlying address 32.

Applicant's label 10 would preferably contain a sealant layer 16 composed of a suitable polyvinyl acetate. The silicone layer comprise a cationic release coating comprised of multi-functional epoxides in a weight percentage of approximately 50 to 95 percent; a photoinitiator for ultraviolet curing in an approximate weight of 1 to 10 percent and a surfactant in an approximate weight of 0 to 5 percent. The ultraviolet cured varnish layer 22 would be comprised of multi-functional acrylate monomers and oligimers in a weight percentage of approximately 70 to 95 percent, a photo initiator blend for ultraviolet curing in an approximate weight percentage of 5 to 20 percent and a surfactant in a weight percentage of approximately 0 to 5 percent.

A separable label assembly in accordance with the aforementioned structure can be imprinted using either the thermal transfer method or the direct thermal printing method which will impart a clear indicia, message or text on the paper layer and which will have the peelable characteristic of being separable between the silicone layer 20 and the varnish layer 22 allowing the user to view any underlying indicia, message or print on the underlying substrate.

While the present invention has been described with respect to the exemplary embodiment thereof, it will be recognized by those or ordinary skill in the art that many modifications can be made without departing from the spirit and scope of the invention. Therefore it is manifestly intended that the peelable label assembly and method of manufacturing same be limited only by the claims.

I claim:

1. A separable label material formed in a continuous roll from which discrete labels are cut comprising:

a layer of paper stock material reactive to a heat source for the development of an indicia in said paper stock material;

a first coating layer comprising a sealant layer applied to the underside of said paper stock material, said sealant layer formed by drying an adhesive to said underside of said paper stock materials;

a second coating layer overlaying said sealant layer, said second coating layer being cured silicone;

a third coating layer overlaid said cured silicone layer, said third layer being a cured layer of varnish;

a pressure sensitive adhesive layer overlaid said varnish layer;

a release agent layer overlaid said layer of chemically treated paper stock material;

said first coating layer comprising a sealant being non-reactive with said paper stock material and said second coating layer so as to permit said paper stock material to develop said indicia from said heat source, said second coating layer and said third coating layer being substantially incompatible such that said second and third coating layer are separable from one another whereby said discrete label can be applied to a surface, and thereafter partially removed from said surface leaving said adhesive layer and said third coating layer on said surface.

2. The continuous roll of separable label material in accordance with claim 1 wherein said paper stock material is reactive to a heated print head such that an indicia in the form of a bar code will appear on said paper stock material under the influence of said heated print head.

3. The continuous roll of separable label material in accordance with claim 1 wherein said sealant layer is a polyvinyl acetate.

4. The continuous roll of separable label material in accordance with claim 1 wherein said release agent layer overlaid said stock material is an ultraviolet or thermally cured silicon.

5. The continuous roll of separable label material in accordance with claim 1 wherein said second coating layer and said third coating layer are cured by means of thermal curing or ultraviolet light.

6. The continuous roll of separable label material in accordance with claim 5 wherein said second coating layer comprises a cationic release coating comprised of multi-functional epoxides in a weight percentage of approximately 50 to 95 percent; a photo initiator for ultraviolet curing in an approximate weight percentage of 1 to 10 percent and a surfactant in an approximate weight percentage of 0 to 5 percent.

7. The continuous roll of separable label material in accordance with claim 5 wherein said third coating layer being an ultraviolet cured layer of varnish comprises the said varnish from a group of multi-functional acrylate monomers and oligimers in a weight percentage of approximately from 70 to 95 percent, a photo initiator blend for ultraviolet curing in a weight percentage of from approximately 5 to 20 percent and a surfactant in a weight percentage of approximately 0 to 5 percent.

8. A separable label assembly comprising:
   a paper stock material reactive to a heat source for the development of an indicia in said paper stock material, said paper stock material having coating layers applied thereto comprising:
      a first coating layer comprising a sealant layer applied to the underside of said paper stock material, said sealant layer formed by drying an adhesive to said underside of said paper stock materials;
      a second coating layer overlaying said sealant layer, said second coating layer being cured silicone;
      a third coating layer overlaid said cured silicone layer, said third layer being a cured layer of varnish;
      a pressure sensitive adhesive layer overlaid said varnish layer;
      a release agent layer overlaid said chemically treated stock material said assembly wound into continuous rolls from which a discrete separable lable may be cut;
      said first coating layer comprising a sealant being non-reactive with said paper stock material and said second coating layer so as to permit said paper stock material to develop said indicia from said heat source, said second coating layer and said third coating layer being substantially incompatible such that said second and third coating layer are separable whereby said discrete separable label can be applied to a surface, and thereafter partially removed from said surface leaving said adhesive layer and said third coating layer on said surface.

9. The separable label assembly in accordance with claim 8 wherein said paper stock material is reactive to a heated print head such that an indicia in the form of a bar code will appear on said paper stock material under the influence of said heated print head.

10. The separable label assembly in accordance with claim 8 wherein said sealant layer is a polyvinyl acetate.

11. The separable label assembly in accordance with claim 8 wherein said release agent layer overlaid the stock material is an ultraviolet or thermally cured silicon.

12. The separable label assembly in accordance with claim 8 wherein said second coating layer and said third coating layer are cured by means of thermal curing or ultraviolet light.

13. The separable label assembly in accordance with claim 12 wherein said second coating layer comprises a cationic release coating comprised of multi-functional epoxides in a weight percentage of approximately 50 to 95 percent; a photo initiator for ultraviolet curing in an approximate weight percentage of 1 to 10 percent and a surfactant in an approximate weight percentage of 0 to 5 percent.

14. The separable label assembly in accordance with claim 12 wherein said third coating layer being an ultraviolet cured layer of varnish comprises the said varnish from a group of multi-functional acrylate monomers and oligimers in a weight percentage of approximately from 70 to 95 percent, a photo initiator blend for ultraviolet curing in a weight percentage of from approximately 5 to 20 percent and a surfactant in a weight percentage of approximately 0 to 5 percent.

* * * * *